US012392462B2

(12) United States Patent
Osur et al.

(10) Patent No.: US 12,392,462 B2
(45) Date of Patent: Aug. 19, 2025

(54) LIGHT FIXTURE FOR CONTOURED CONTEXT INSTALLATION

(71) Applicant: Coronet Inc., Totowa, NJ (US)

(72) Inventors: Russell Osur, Totowa, NJ (US); Tyler Mark, Totowa, NJ (US); Brandon Nelan, Totowa, NJ (US); Alina Ainza, Totowa, NJ (US)

(73) Assignee: Coronet Inc., Totowa, NJ (US)

( * ) Notice: Subject to any disclaimer, the term of this patent is extended or adjusted under 35 U.S.C. 154(b) by 53 days.

(21) Appl. No.: 18/401,098

(22) Filed: Dec. 29, 2023

(65) Prior Publication Data

US 2025/0216041 A1 Jul. 3, 2025

(51) Int. Cl.

| | |
|---|---|
| ***F21S 4/22*** | (2016.01) |
| ***F21S 8/04*** | (2006.01) |
| ***F21V 5/00*** | (2018.01) |
| ***F21V 17/10*** | (2006.01) |

(52) U.S. Cl.

CPC . *F21S 4/22* (2016.01); *F21S 8/04* (2013.01); *F21V 5/00* (2013.01); *F21V 17/10* (2013.01)

(58) Field of Classification Search

CPC ...... F21S 8/026; F21S 8/04; F21S 4/22; F21S 4/24; F21S 4/28; F21V 33/006; F21V 21/049; E04F 2290/026

See application file for complete search history.

(56) References Cited

U.S. PATENT DOCUMENTS

| | | | | |
|---|---|---|---|---|
| 5,961,072 A * | 10/1999 | Bodle | G08B 7/066 362/153 |
| 11,499,686 B1 * | 11/2022 | Machlis | F21V 5/04 |
| 2009/0021936 A1 * | 1/2009 | Stimac | F21S 2/005 362/249.02 |
| 2016/0327223 A1 * | 11/2016 | Venk | H05K 1/028 |

FOREIGN PATENT DOCUMENTS

DE 202019005051 U1 * 2/2020

OTHER PUBLICATIONS

Machine translation of DE202019005051U1, retrieved from worldwide.espacenet.com on Apr. 15, 2025 (Year: 2025).*

* cited by examiner

*Primary Examiner* — Abdulmajeed Aziz
*Assistant Examiner* — Steven Y Horikoshi
(74) *Attorney, Agent, or Firm* — Maginot, Moore & Beck LLP

(57) ABSTRACT

A light fixture assembly includes a bracket, a flexible substrate, and a flexible lens. The bracket has a plurality of connected segments. Each segment has a back wall operably connected to a back wall of an adjacent segment such as to allow relative rotatable movement therebetween. Each segment has a top wall fixedly attached to the back wall, and a bottom wall fixedly attached to the back wall. The flexible substrate has a plurality of lamps affixed thereto. The flexible substrate is attached to the back walls of at least some of the connected segments. The flexible lens is configured to be mounted to the top walls and the bottom walls of at least some of the segments, such that light from the plurality of lamps radiates through the lens.

17 Claims, 6 Drawing Sheets

LIGHT FIXTURE FOR CONTOURED CONTEXT INSTALLATION

FIELD OF THE INVENTION

The present invention relates generally to lighting fixtures.

BACKGROUND

Lighting fixtures for commercial, industrial, accent and home use often install directly in the ceiling or wall of a room or space of a building. LED lighting fixtures have gained popularity in many applications due to the efficiency of LED lighting, and the flexibility in lighting fixture design. An LED lighting fixture typically include a fixture frame that supports LED lights, electrical circuits that provide power to the LED lights, and a lens through which light from the fixture can illuminate a space.

It is desirable in some cases to provide lighting fixtures that conform to the shape of the wall and/or ceiling to which they are attached. Lighting fixtures arranged for curved walls are particularly challenging because the radius of curvature of the wall can vary significantly, as opposed to straight walls and/or wall corners.

Accordingly, there is a need for a lighting fixture that can readily be adapted for use in curved walls of varying radii.

SUMMARY

The embodiments disclosed herein address the above-referenced need, as well as others, by flexible lighting fixture having a segmented mounting bracket. The flexible bracket and other features allow the fixture to be readily be curved (e.g. bent) in any number of curved shapes.

A first embodiment is light fixture assembly that includes a bracket, a flexible substrate, and a flexible lens. The bracket has a plurality of connected segments. Each segment has a back wall operably connected to a back wall of an adjacent segment such as to allow relative rotatable movement therebetween. Each segment has a top wall fixedly attached to the back wall, and a bottom wall fixedly attached to the back wall. The flexible substrate has a plurality of lamps affixed thereto. The flexible substrate is attached to the back walls of the plurality of connected segments. The flexible lens is configured to be mounted to the top walls and the bottom walls of at least some of the segments, such that light from the plurality of lamps radiates through the lens.

The above-described features and advantages, as well as others, will become more readily apparent to those of ordinary skill in the art by reference to the following detailed description and accompanying drawings.

DETAILED DESCRIPTION

Figure 1:
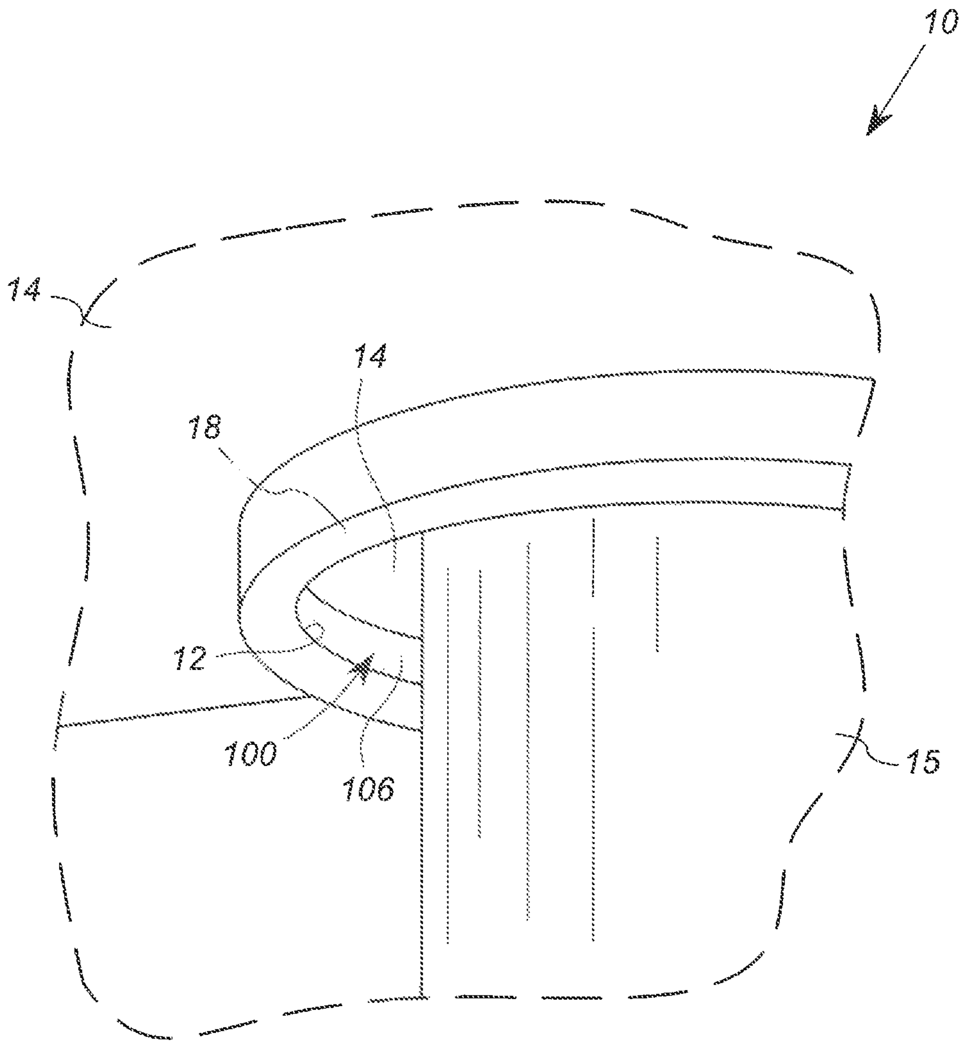
FIG. 1 shows a bottom fragmentary perspective view of a cove having a light fixture according to a first embodiment.
Figure 2:
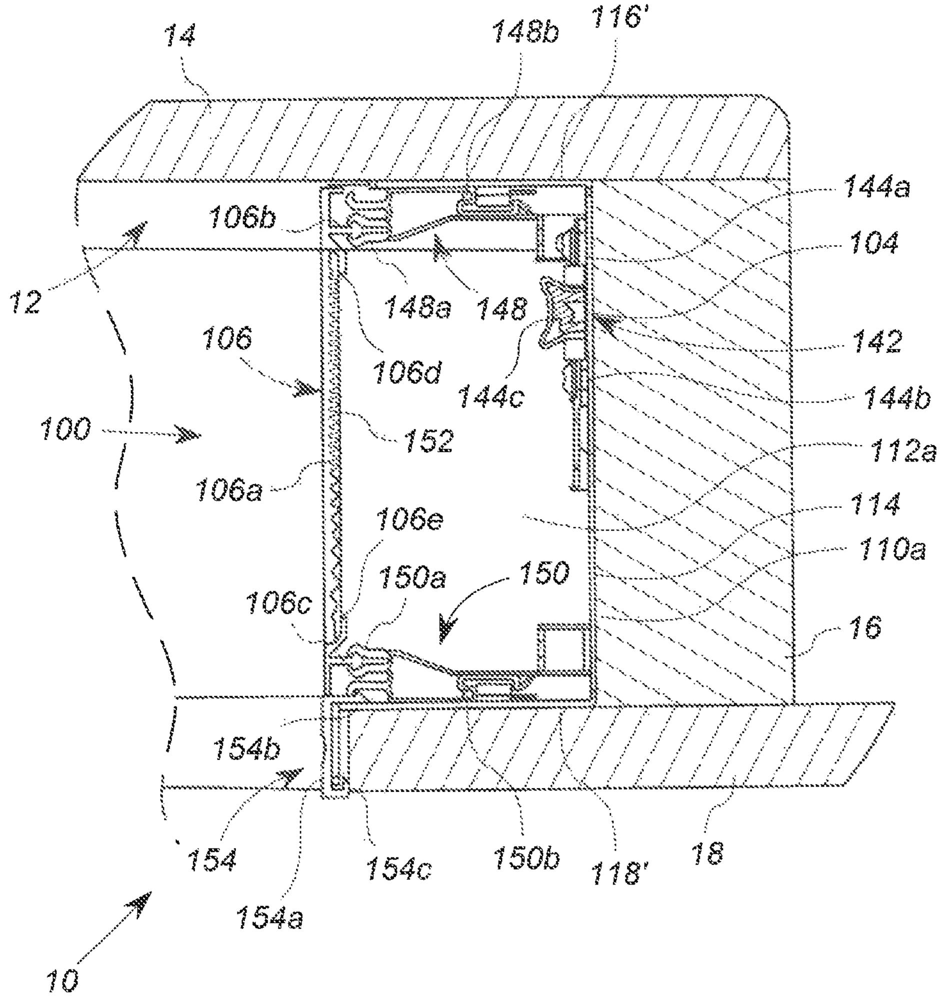
FIG. 2 shows a cutaway view of the light fixture of FIG. 1 in a fragmentary portion of the cove of FIG. 1.

FIG. 1 shows perspective view of an illuminated contoured cove 10 that includes a light fixture assembly 100 according to a first embodiment. FIG. 2 shows a cutaway view of the illuminated cove of FIG. 1 taken from near an end of the fixture assembly 100. The illuminated contour cover 10 can suitably be located within a building or other architectural structure, not shown.

The illuminated contoured cove 10 in this embodiment includes a cove 12 and the fixture assembly 100. The cove 12 is a concave space formed by a portion of an upper wall 14, a backing wall 16, and a cove base 18. As shown in FIG. 2, the backing wall 16 extends from the upper wall 14 to the cove base 18 to form the concave space. As shown in FIG. 1, the cove 12 in this embodiment extends in a contoured manner, as a result of the cove base 18 and backing wall 16 (not visible in FIG. 2) similarly extending a contoured manner. In many cases, the cove base 18 and backing wall 16 extend in a manner that defines a contoured cove 12 having a uniform cross-section that takes the form shown in FIG. 2.

In this example, the cove 12 is part of an architectural feature that includes a pillar 15 around which the cove 12 extends. However, it will be appreciated that coves may be used in a variety of settings, and that cove 12 is given only by way of example. For example, the upper wall 14 and/or the cove base 18 may form all or part of the ceiling of a room or other interior or exterior space. In other embodiments, the cove 12 may constitute an inset from a wall, not shown, or other architectural structure that is below and/or near the ceiling. The fixture assembly 100 is compatible with coves 12 disposed in any commercially known cove structure having an upper wall, base and backing wall.

Figure 3:
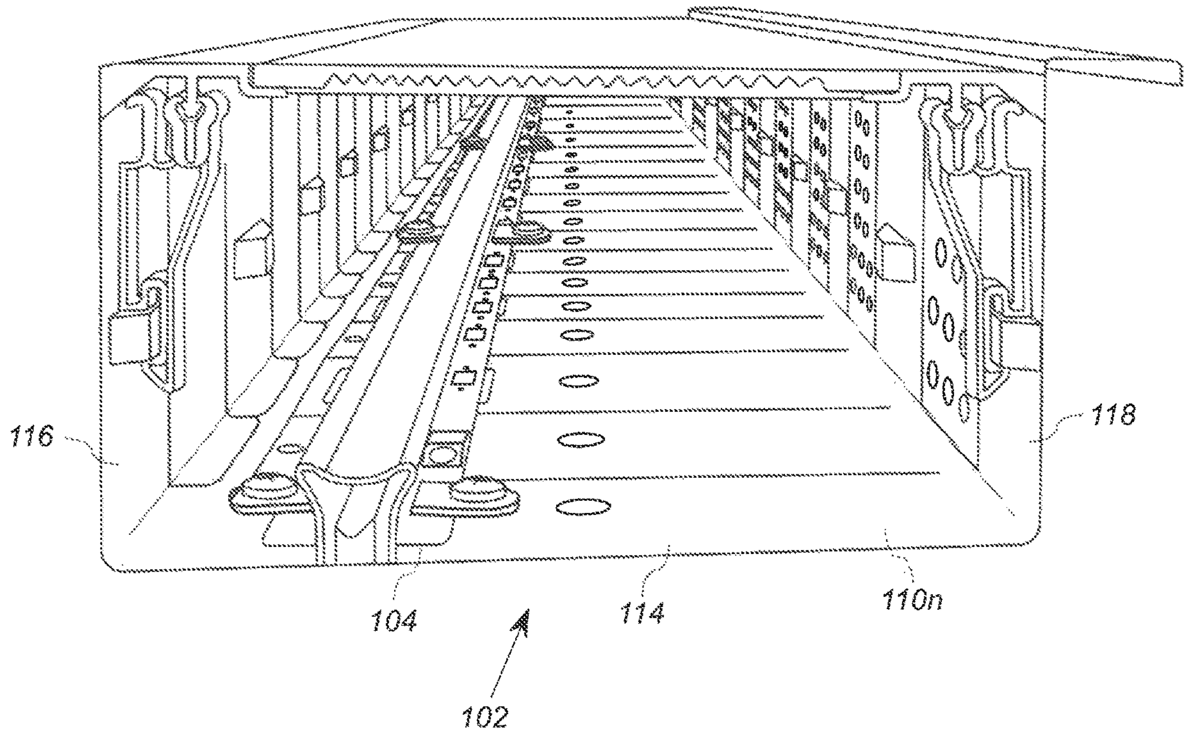
FIG. 3 shows an elevated perspective end view of the light fixture assembly of FIG. 1 in a non-contoured state without end plates.
Figure 4:
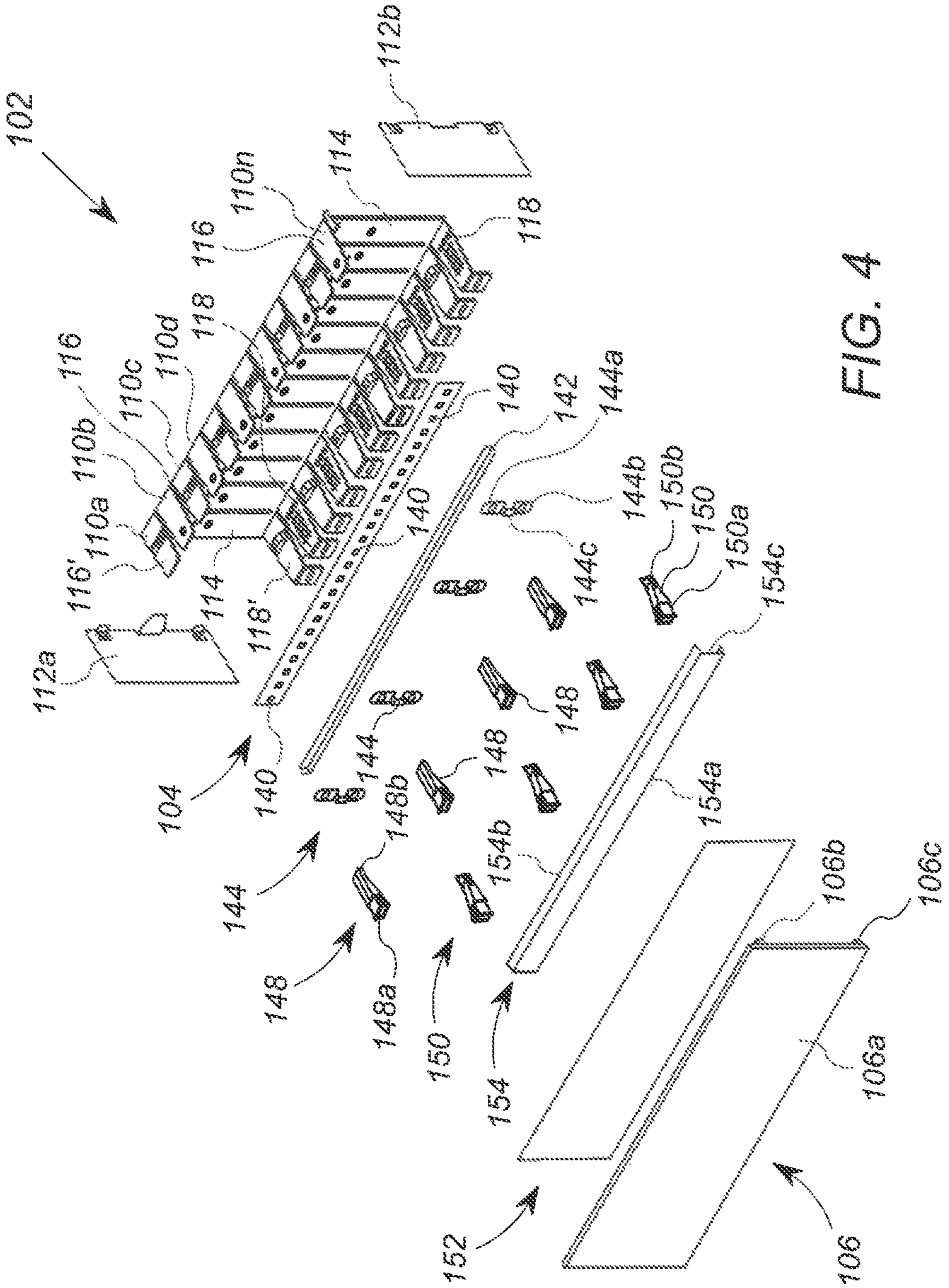
FIG. 4 shows an exploded perspective view of the light fixture of FIG. 1.

In general, the fixture assembly 100 includes a configurable bracket 102, a flexible substrate 104 having a plurality of lamps affixed thereto, and a flexible lens 106. Further detail regarding the structure of the fixture assembly 100 is provided below with additional reference to FIGS. 3 and 4. FIG. 3 shows a slightly elevated end view of the fixture assembly 100 apart from the cove 12, and in a non-contoured state. FIG. 4. shows an exploded perspective view of the fixture assembly 100, also in a non-contoured state. As will be discussed below, the fixture assembly 100 is configured to flex along its length to fit contoured coves such as the cove 12 of FIG. 1, or other contoured surfaces.

With reference to FIGS. 2, 3 and 4, the bracket 102 of the fixture assembly 100 has a plurality of connected segments 110*a*, 110*b*, 110*c* and so forth, and two end plates 112*a*, 112*b*. Each segment 110*a*, 110*b*, 110*c*, . . . 110*n* and so forth has a back wall 114, a top wall 116 or 116', and a bottom wall 118 or 118'. The back wall 114 of each segment 110*a*, 110*b*, 110*c*, . . . 110*n* is operably connected to a back wall 114 of an adjacent segment 110*a*, 110*b*, 110*c*, . . . 110*n* to allow relative rotatable movement therebetween. Accordingly, it will be appreciated that most segments 110*b*, 110*c*, etc. have back walls 114 that are coupled on either side to back walls 114 of other segments. For example, the segment 110*b* has a back wall 114 that is coupled on either side to the back walls 114 of adjacent segments 110*a* and 110*c*. By contrast, the first segment 110*a* is coupled only on one side to the segment 110*b*, and on the other side to the end plate 112*a*.

Similarly, the last segment 110*n* is coupled only on one side to a segment, and on the other side to the end plate 112*b*.

Figure 5:
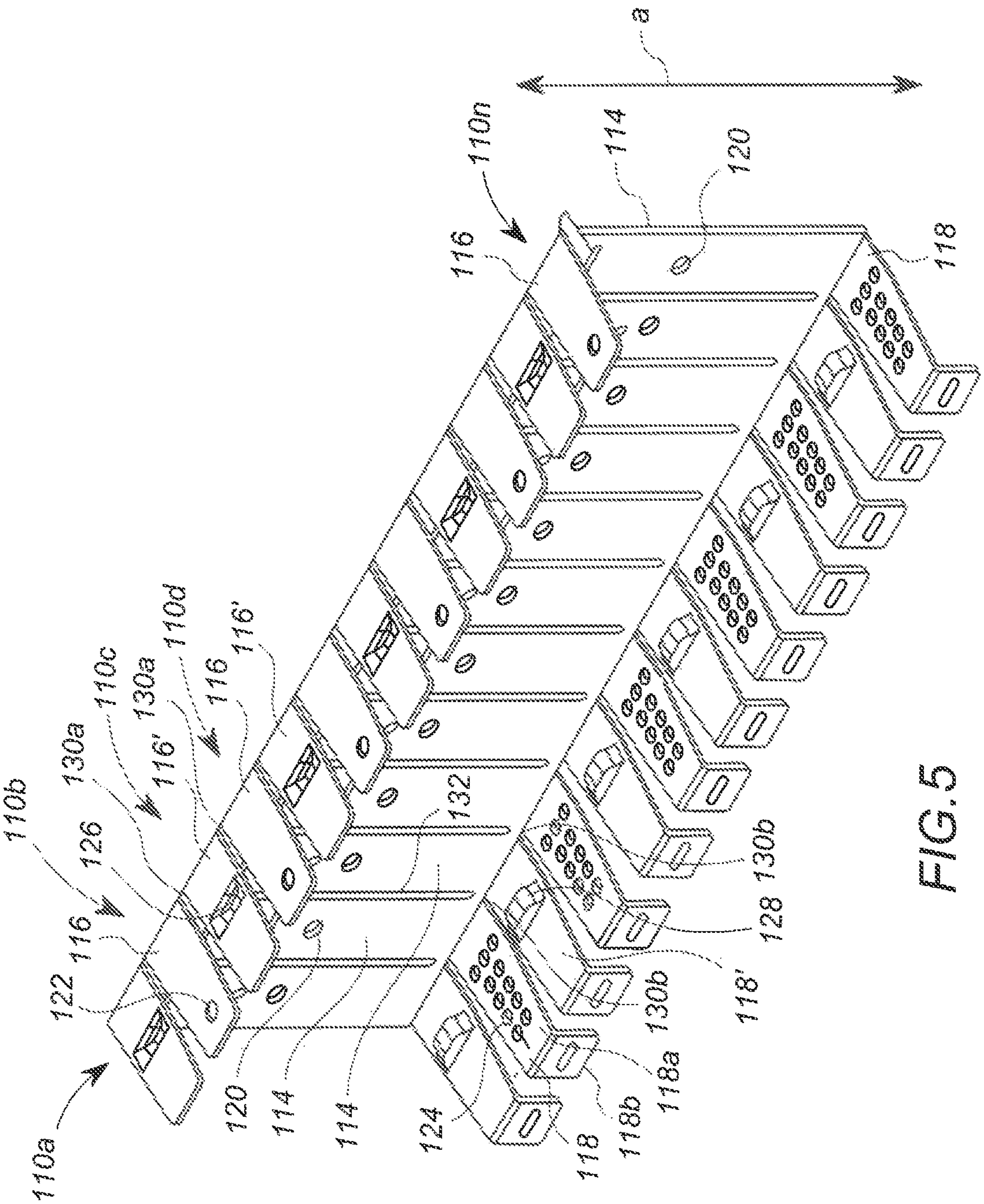
FIG. 5 shows a perspective view of a bracket of the light fixture of FIG. 1.

Further detail regarding the bracket 102 is provided in connection with FIG. 5. FIG. 5 shows an enlarged perspective view of the plurality of segments 110*a*, 110*b*, 110*c*, . . . 110*n* of the bracket 102 without the end plates 112*a*, 112*b*. Referring to the segment 110*b*, the back wall 114 may be in the form of an elongate malleable plate, such as an aluminum plate, that extends vertically lengthwise from the top wall 116 to the bottom wall 118. It will be appreciated that the use of the directional terms "vertical", "top", "bottom", etc. refers to directions with respect to the mounting of lighting assembly 100 as shown in FIG. 2, wherein the back wall 114 extends vertically on a vertical wall. Embodiments of the lighting assembly may also be mounted in such that the back wall 114 of the segments 110*a*, 110*b*, 110*c*, . . . 110*n* extends horizontally, such as against a ceiling. In such embodiments, it will be appreciated that any vertical and horizontal references would be changed accordingly.

Referring again to the present embodiment, as shown in FIG. 5, the back wall 114 includes through-holes 120 used for mounting the bracket 102 to a wall, for example, the wall 16 of FIG. 2, using suitable fasteners. The segment 110*b* in this embodiment has a first top wall 116 of two configurations of top walls 116, 116' in the bracket 102, and a first bottom wall 118 of two configurations of bottom walls 118, 118' in the bracket 102.

The back wall 114 of the segment 110*b* is coupled to the back wall of the adjacent segment 110*c* by at least one flexible hinge, and in this case flexible hinges 130*a*, 130*b*. The flexible hinge 130*a* is connected at the tops of the back walls 114 of the segments 110*b*, 110*c*, and the flexible hinge 130*b* is connected at the bottoms of the back walls 114 of the segments 110*b*, 110*c*. The flexible hinges 130*a*, 130*b* define a vertical axis, parallel to the axis a of FIG. 5, of relative rotation or pivotal movement between the segment 110*b* and the segment 110*c*. The flexible hinges 130*a*, 130*b* are configured to flex and rotate about the vertical axis under external force (other than mere weight of the bracket 102), such as manual bending force. It will be appreciated that the flexible hinges 130*a*, 130*b* in some embodiments can have less stiffness such that they can bend under their own weight. However, the present embodiment provides the advantage of shape retention after fitting. As a consequence, the flexible hinges 130*a*, 130*b* can be flexed or rotated in to select relative angle, and upon removal of the external force, retain that relative angle absent external force (i.e., does not deform under its own weight).

All of the segments 110*a*, 110*b*, 110*c* . . . 110*n* are connected to each other by similar flexible hinges, such that all are capable of relative pivotal or rotational movement about vertical axes parallel to the vertical axes a shown in FIG. 5. By contrast, the top walls 116, 116' and the bottom walls 118, 118' of the segments 110*a*, 110*b*, 110*c* . . . 110*n* are not connected to each other in order to allow them to rotate with respect to each other about the vertical axes. The relative rotational angle between each set of adjacent segments 110*a*, 110*b*, 110*c* . . . 110*n* may be different, or the same. As a result, the bracket 102 may be flexed in many ways, including moderately tight curves, S-curves, etc.

The flexible hinges 130*a*, 130*b* in this embodiment are integral to the back walls 114 of the segments 110*b*, 110*c*. Specifically, as discussed above, the segments 110*a*, 110*b*, 110*c* . . . 110*n* in this embodiment are formed from a single sheet of metal. The segments 110*a*, 110*b*, 110*c* . . . 110*n* are formed by punching out the metal between adjacent segments. To form the flexible hinges 130*a*, 130*b*, a small portion of the metal near the tops of the back walls 114 between adjacent segments 110*b* and 110*c* is not punched, or in other words is left in place. This creates an interior void 132 between the back walls 114 of the segments 110*b*, 110*c*, and between the flexible hinges 130*a*, 130*b*. The flexible hinges 130*a*, 130*b* and void 132 are configured to retain a strong connection between the segments 110*b*, 110*c*, but also create reduced stiffness about the axis a. The reduced stiffness allows at least some relative rotational movement between the segments 110*b*, 110*c* about the axis a when suitable pressure is applied. It will be appreciated that the back wall 114 of the segment 110*b* is preferably coupled to the segment 110*a* in the same manner, thereby providing a similar axis of rotation (parallel to the axis a) between the segments 110*a*, 110*b*.

The top wall 116 extends away from a first end of the back wall 114 in a first direction, which in this embodiment perpendicularly. The top wall 116 is fixedly attached to the back wall 114. The top wall 116 in this embodiment is also an elongate plate, and may be formed from the same piece of metal as the back wall 114. The top wall 116 of the segment 110*b* further includes at least one through-hole 122 that may be used for mounting the bracket 102 to a wall, such as the upper wall 14 of the cove 12, as shown in FIG. 2.

The bottom wall 118 has a main portion 118*a* that extends away from the second end of the back wall 114 in generally the same first direction. The bottom wall 118 is fixedly attached to the back wall 114. The bottom wall 118 in this embodiment also includes a bent portion 118*b* that extends from the end of the main portion 118*a* in a second direction generally perpendicular to the first direction. The second direction may extend in the same general direction as the back wall 114. In general, the main portion 118*a* may suitably be an elongate plate and the bent portion 118*b* may be formed from the same material as the main portion 118*a*, with both portions 118*a*, 118*b* formed from the same piece of metal as the back wall 114. The main portion 118*a* of the bottom wall 118 of the segment 110*b* further includes at least one through-hole 124 that may be used for mounting the bracket 102 to a wall, such as the lower wall 18 of the cove 12, as shown in FIG. 2.

A first subset of the segments 110*a*, 110*b*, 110*c* . . . 110*n* may have the same structure as the segment 102*b*. In this embodiment, another subset of the segments 110*a*, 110*b*, 110*c* . . . 110*n* may have the same general structure, but with different configurations of the top wall 116' and the bottom wall 118'. By way of example, each of the segments 110*a*, 110*c* has a back wall 114 identical to that of the segment 102*b*, but has a different top wall 116' that has a different configuration than the top wall 116. Likewise, the segment 112*c* may have a different bottom wall 118' than the bottom wall 118.

The alternative configuration of the top wall 116' is identical to the top wall 116 but includes a bridge lance 126 instead of the through-hole 122. The bridge lance 126 is a downward bridge structure that allows for connection of a clip, a will be discussed further below. Likewise, the alternative configuration of the bottom wall 118' is identical to the bottom wall 118 but includes another bridge lance 128 instead of the at least one through-hole 124. The bridge lance 128 is likewise a bridge structure that allows for connection of a clip, a will be discussed further below. The bridge lances 126, 128 may be formed from partially punched out metal strips that extend vertically from the surfaces of the surfaces of, but remain connected at either end to, the top wall 116' and the bottom wall 118', respectively.

In this embodiment, every other segment 110*b*, 110*d* and so forth has the first configuration of the top wall 116 and bottom wall 118, and every other segment 110*a*, 110*c* etc. have the second configuration of the top wall 116' and bottom wall 118'. However, it will be appreciated that in other embodiments, the configurations need not alternate, or need not even be split into multiple configurations. It will be appreciated that to the extent bridge lances 126, 128 and through-holes 122, 124 are used, they may be arranged on the tops and bottom walls of the segments 110*a*, 110*b*, 110*c* and so forth in any configuration, or even on the same segments.

In general, the adjacent segments 110*a*, 110*b*, 110*c* form a flexible C-shaped frame or channel in which lighting elements may be disposed, as will be discussed further below.

Referring again to FIGS. 2, 3 and 4, the flexible substrate 104 includes a plurality of LED lamps 140 affixed thereto. The flexible substrate 104 can extend the length of the bracket 102 and is affixed to the back walls 114 of at least some of the segments 110*a*, 110*b*, 110*c* and so forth. The flexible substrate 104 in this embodiment is affixed at least partly via adhesive backing on the flexible substrate 104. The flexible substrate 104 and lamps 140 may suitably be a flexible LED module available from Luxtech LLC of Philadelphia, Pa.

It will be appreciated that in some embodiments the flexible substrate 104 can be affixed instead to the top walls 116, 116' to provide a different angle of light emission.

The fixture 100 further includes a flexible linear optic 142 which is configured to extend over the LED lamps 140 of the flexible substrate 104, and reflect and/or refract light generated by the LED lamps 140 to concentrate the light in a select direction. Such flexible linear optics may suitably be formed of PMMA, and have a geometry configured to enhance the concentration of the generated light to a desired feature of the cove 12 or other architectural element. In this embodiment, the flexible linear optic 142 is affixed against or adjacent to the LED lamps 140 by a plurality of clips 144. The clips 144 and the linear optic 142 also support the flexible substrate 104 against the back wall. Each of the plurality of clips 144 has two feet 144*a*, 144*b* that are coupled to the back walls 114 of at least some of the segments 110*a*, 110*b*, 110*c* . . . 110*n*. Each of the plurality of clips 144 has a bridge section 144*c* that extends over the flexible linear optic 142, lamps 140 and substrate 104 between the feet 144*a* and 144*b*.

The flexible lens 106 in this embodiment may also be a PMMA structure that passes light and covers the interior of the fixture 100. The flexible lens 106 in this embodiment has a flexible lens plate 106*a* that includes an asymmetric throw ribbing pattern for directing light in a predetermined, select direction. The flexible lens plate 106*a* extends lengthwise approximately the length of the bracket 102. The flexible lens 106 further includes an upper connection rib 106*b* and a lower connection rib 106*c*, both of which may be integrally formed with the lens plate 106*a*. The upper connection rib 106*b* is disposed on the rear of, and near the top of, the lens plate 106*a*, and extends substantially the entire length of the lens 106. The lower connection rib 106*c* is disposed on the rear of, and near the bottom of, the lens plate 106*a*, and extends substantially the entire length of the lens 106.

The upper connection rib 106*b* is configured to be received by a first snap clip 148*a* of each of a plurality of double clips 148, and the lower connection rib 106*c* is configured to be received by a first snap clap 150*a* of each of another plurality of double clips 150. The second snap clip 148*b* of each of the double clips 148 is configured to receive and engage a corresponding one of the bridge lances 126 on the bracket 102, and the second snap clip 150*b* of each of the double clips 150 is configured to receive and engage a corresponding one of the bridge lances 128 of the bracket 102. As a result, the lens 106 is operably coupled to bracket 102.

The fixture 100 in this embodiment further includes an additional flexible diffusion lens or film 152, which may be frosted to soften the light. The flexible diffusion film 152 is operably coupled to or against the lens 106. To this end, the lens 106 in this embodiment further includes an upper channel 106*d* and a lower channel 106*e*. The upper channel 106*d* has a downward facing opening, and extends below and along the upper connection tab 106*b*. Conversely, the lower channel 106*e* has an upward facing opening, and extends above and along the lower connection tab 106*c*. The upper and lower channels 106*d*, 106*e* are configured to receive the edges of the flexible diffusion film 152 to secure retain the film 152 against the lens 106.

The fixture 100 in this embodiment further includes a flexible spackle plate 154 that extends the length of the fixture 100, and has a vertical width to extend over the bent portion 118*b* of the bottom plates 118, 118' of the segments 110*a*, 110*b*, 110*c* . . . 110*n* of the bracket 102. The spackle plate 154 includes a front face plate 154*a*, a top plate 154*b*, and bottom hook 154*c*. The front face plate 154*a* is configured to extend downward on or against an exposed edge of the cove base 18 if necessary, in order to provide a base for spackling to finish the installation. The top plate 154*b* is configured extend part way along the bottom walls 118, 118', and may be secured in position by a feature that interacts with a corresponding mating feature on the clips 150. The bottom hook 154*c* extends from the bottom face plate 154*a* to receive and engage the bottom edge of the bent portion 118*b* of the bottom walls 118, 118'.

In at least one embodiment, the design of the light fixture 100 allows not only for various curved shapes, but also facilitates producing versions of the light fixture 100 at select lengths. In particular, to generate the light fixture 100 at a select length, the user obtains a bracket 102 having a quantity of segments 110*a*, 110*b*, 110*c* . . . 110*n* corresponding to the desired length. To this end, the user can cut or otherwise separate the select number of segments 110*a*, 110*b* etc. from a blank formed of longer set of segments, not shown, but which would constitute a longer version of the segments 110*a*, 110*b*, 110*c* . . . 110*n* shown in FIG. 5. As discussed above, the flexible substrate 104 and lamps 140 may suitably be a flexible LED module available from Luxtech LLC of Philadelphia, Pa, which are provided on a long, wound roll that allows custom lengths to be cut. Thus, the flexible substrate 104 in this embodiment may be cut to a length corresponding to the desired length. In a similar manner, the lens 106, the linear optic 142, the flexible film 152, and the spackle plate 154 all have generally uniform cross-sections in this embodiment, and thus may be cut to any suitable length.

In operation, the light fixture 100 is initially in a non-contoured state, such as shown in FIGS. 3, 4 and 5. The user then configures the light fixture 100 to the desired length for the cove 12 in the manner discussed above. The light fixture 100 can then be manually bent (or with the aid of tools) along the vertical axes between adjacent ones of the segments 110*a*, 110*b*, 110*c*, . . . 110*n* to achieve a contour that matches approximately the backing wall 16 of the cove 12. The light fixture 100 may then be wired and affixed to the back wall 16, the top wall 14 and/or the cove base 18 of the cove 12 in any suitable manner.

Figure 6:
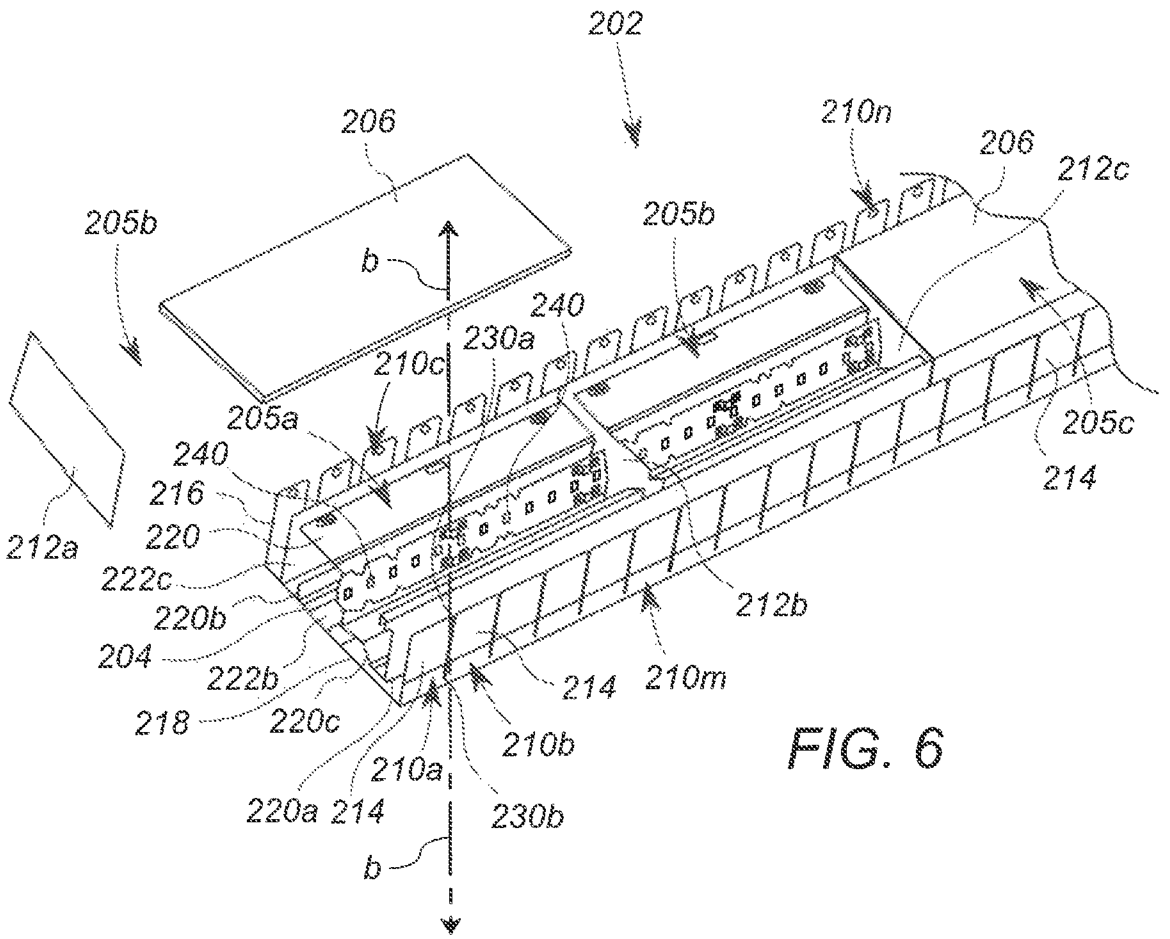
FIG. 6 shows a partially exploded, perspective view of a light fixture according to a second embodiment.
Figure 7:
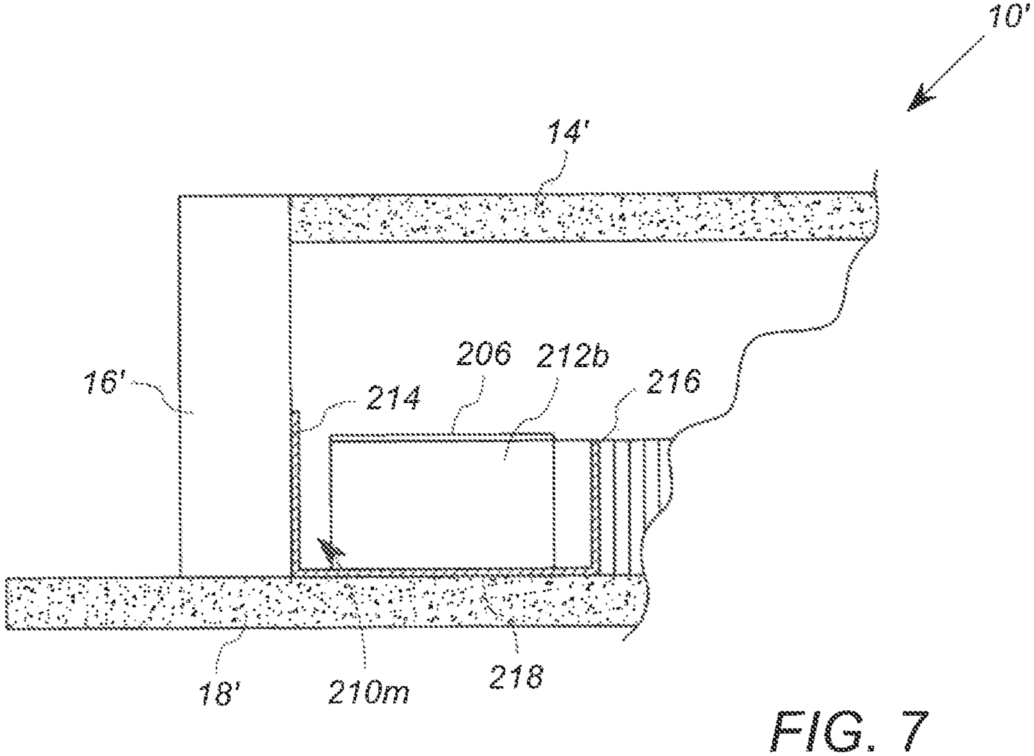
FIG. 7 shows a cutaway view of the light fixture of FIG. 6 in a fragmentary portion of a cove of a building or facility.

Another embodiment of lighting fixture 200 that may also be manually contoured and easily adjusted to multiple lengths is shown in FIGS. 6 and 7. FIG. 6 shows a partially exploded, fragmentary perspective view of the lighting fixture 200, and FIG. 7 shows a cutaway view of the lighting fixture 200 of FIG. 6 disposed in cove 12'.

In general, the fixture assembly 200 includes a bracket 202 and a plurality of lamp modules 205*a*, 205*b*, 205*cc*. Each of the lamp modules 205*a*, 205*b*, 205*c* includes a module frame 222 at least one substrate 204 having a plurality of lamps affixed thereto, and a lens 206. As will be discussed below, the fixture assembly 200 is configured to flex along its length to fit contoured coves such as the cove 12' of FIG. 7, or other contoured surfaces.

With reference to FIGS. 6 and 7, the bracket 202 of the fixture assembly 100 has a plurality of connected segments 210*a*, 210*b*, 210*c* and so forth. Each segment 210*a*, 210*b*, 210*c*, 210*n* and so forth has a front wall 214, an end wall 216, and a bottom wall 218. The front wall 214 of each segment 210*a*, 210*b*, 210*c*, . . . 210*n* is operably connected to a front wall 214 of an adjacent segment 210*a*, 210*b*, 210*c*, . . . 210*n* to allow relative rotatable movement therebetween. Accordingly, it will be appreciated that most segments 210*b*, 210*c*, etc. have back walls 214 that are coupled on either side to back walls 214 of other segments, similar to the back walls 114 of the segments 110*a*, 110*b*, 110*c* discussed above in connection with FIGS. 2 to 5.

Referring to the segment 210*a*, the front wall 214 may be in the form of an elongate malleable plate, such as an aluminum plate, that extends vertically lengthwise up from a first end of the bottom wall 218. The end wall 216 may have a similar form, and extends vertically up from a second end of the bottom wall 218 is also an elongate plate. As discussed above, it will be appreciated that the use of the directional terms “vertical”, “top”, “bottom”, etc. refers to directions with respect to the mounting of lighting assembly 100 as shown in FIG. 7, wherein the bottom wall 114 is disposed on extends horizontally along horizontal support surface, such as the cove base 18' of the cove 12' of FIG. 7.

The front wall 214 of the segment 210 is coupled to the front wall 214 of the adjacent segment 210*b* by at least one flexible hinge 230*a*, 230*b*, which may suitably be the same in form and function as the flexible hinges 130*a*, 130*b*. The flexible hinge 230*a* is connected at the tops of the back walls 214 of the segments 210*a*, 210*b*, and the flexible hinge 230*b* is connected at the bottoms of the back walls 214 of the segments 210*a*, 210*b*. The flexible hinges 230*a*, 230*b* define a vertical axis b of relative rotation or pivotal movement between the segment 210*a* and the segment 210*b*. The flexible hinges 230*a*, 230*b* may suitably have the same flex properties as those described above in connection with the hinges 130*a*, 130.

All of the segments 210*a*, 210*b*, 210*c* . . . 210*n* are connected to each other by similar flexible hinges. As a result, all of the segments 210*a*, 210*b*, 210*c* . . . 210*n* are capable of relative pivotal or rotational movement about vertical axes parallel to the vertical axes b shown in FIG. 6. By contrast, the end walls 216 and the bottom walls 218 of the segments 210*a*, 210*b*, 210*c* . . . 210*n* are not connected to each other in order to allow them to rotate with respect to each other about the vertical axes. The relative rotational angle between each set of adjacent segments 210*a*, 210*b*, 210*c* . . . 210*n* may be different, or the same. As a result, the bracket 202 may be flexed in many ways, including moderately tight curves, S-curves, etc.

As with the bracket 102, the segments 210*a*, 210*b*, 210*c* . . . 210*n* and hinges 230*a*, 230*b* in this embodiment are formed from a single sheet of metal. The segments 210*a*, 210*b*, 210*c* . . . 210*n* all have substantially the same structure, but may have different through hole patterns or other surface features.

In this embodiment, the lamp modules 205*a*, 205*b*, 205*c* are disposed serially (or end-to-end) along and within the U-shaped channel formed by the adjacent segments 210*a*, 210*b*, 210*c* of the bracket 202. In this embodiment, each lamp module 205*a*, 205*b*, 205*c* is generally in the form of rectangular box, and includes a front wall 220*a*, a rear wall 222*c*, and a bottom section 220*c*, 222*b*.

Referring the lamp module 205*a* by way of example, in this embodiment, each lamp module 205*a*, 205*b*, 205*c* includes a first frame 220 and a second frame 222. The first frame 220 includes the front wall 220*a*, an angled surface 220*b*, and a portion 220*c* of the bottom section 220*c*, 222*b*. The second frame 222 includes the rear wall 222*c*, and the other portion 222*b* of the bottom section 220*c*, 222*b*. The bottom portions 220*c*, 222*b*, run parallel to each other to collectively form the bottom of the lamp module 205*a*.

The angled surface 220*b* extends upward and diagonally rearward from the bottom potion 220*c*. The angled surface 220*b* forms a mount for the substrate 204. As with the flexible substrate 104, the substrate 204 includes a plurality of LED lamps 240 affixed thereto. The substrate 204 can extend the length of the module 205 and is affixed to the angled surface 220*b* of the first frame 220. The substrate 204 and lamps 240 may suitably be a flexible LED module available from Luxtech LLC of Philadelphia, Pa. However, in this embodiment, it is not necessary for the substrate 204 to be flexible, since the lamp modules 205*a*, 205*b*, 205*c* do not themselves bend by a significant amount.

Each module 205*b*, 205*c* has a structure similar to that of the lamp module 205*a*. Each module 205*a*, 205*b*, 205*c* is mounted within the bracket 202 such that the individual segments 210*a*, 210*b*, 210*c* . . . 210*n* can rotate or bend partially about axes parallel to the axes b without damaging the corresponding lamp module 205*a*, 205*b*, 205*c*.

Each lens 206 in this embodiment may be a PMMA structure similar to the lens 106, which passes light. In general, each lens 206 covers a corresponding lamp module 205*a*, 205*b*, 205*c*. To this end, each lens 206 extends lengthwise approximately the length and width of the corresponding lamp module 205*a*, 205*b*, 205*c*. It will be appreciated, however, that the lens 206 in this embodiment need not have the flexibility of the lens 106.

In use, the bracket 202 may be manually contoured about the axes of rotations of the back walls 214 of the segments 210*a*, 210*b*, 210*c* . . . 210*n*. The lamp modules 205*a*, 205*b*, 205*c* do not necessarily bend, but instead retain their shape within the contoured set of segments 210*a*, 210*b*, 210*c* . . . 210*n* in which they are located. As a result of contouring the bracket 202 to have curves the lamp modules 205*a*, 205*b*, 205*c* can be at skewed angles with respect to each other.

The embodiment of FIGS. 6 and 7 can provide for a different cove lighting effect than that of the embodiment of FIGS. 1 to 5, and thus has advantages in particular implementations.

It will be appreciated that the above describe embodiments are merely exemplary, and that those of ordinary skill in the art may readily devise their own implementations and modifications that incorporate the principles of the present invention and fall within the spirit and scope thereof.

The invention claimed is:

1. A light fixture assembly, comprising:

a bracket having a plurality of connected segments, each segment having a first wall operably connected to a first wall of an adjacent segment such as to allow relative rotatable movement therebetween, each of at least a first segment and a second segment of the plurality of connected segments having at least a second wall fixedly attached to the first wall;

a substrate having a plurality of lamps affixed thereto, the substrate configured to be disposed within a channel formed by at least the first wall and the second wall; and a lens configured to be disposed above the substrate within the channel, such that light from the plurality of lamps radiates through the lens;

wherein each of the connected segments includes a third wall extending between the first wall and the second wall, wherein the second wall of each segment is spaced apart from the second wall of an adjacent segment, and wherein the third wall forms a part of the channel; and wherein the substrate and lens are formed as a first lamp module disposed within the channel, and further comprising at least a further lamp module disposed within the channel, the further lamp module having a further substrate having a further plurality of lamps affixed thereto, and a further lens disposed above the further substrate, such that light from the further plurality of lamps radiates through the further lens.

2. The light fixture assembly of claim 1, wherein the substrate is a flexible substrate coupled to flex correspondingly with flexing of the first segment and the second segment.

3. The light fixture of claim 1, further comprising at least one flexible hinge rotatably coupling the first segment to the second segment to define a select angle of a plurality of configurable angles between the first segment and the second segment.

4. The light fixture of claim 3, wherein the flexible hinge is configured to retain the select angle absent applied external force.

5. The light fixture of claim 3, wherein the first segment, second segment and the at least one flexible hinge are integrally formed together.

6. The light fixture of claim 1, wherein the second wall of the first segment further includes a throughhole for receiving a fastener.

7. The light fixture of claim 1, further comprising at least one flexible hinge rotatably coupling the first segment to the second segment to define a select angle of a plurality of configurable angles between the first segment and the second segment; and wherein the flexible hinge is configured to retain the select angle absent applied external force.

8. The light fixture of claim 1, wherein the first lamp module includes a front wall and a rear wall, and wherein the substrate is disposed between at least indirectly coupled to the front wall and the rear wall.

9. The light fixture of claim 8, wherein the lens extends at least in part between the front wall and the rear wall above the substrate.

10. A light fixture assembly, comprising:

a bracket having a plurality of connected segments, each segment having a first wall operably connected to a first wall of an adjacent segment such as to allow relative rotatable movement therebetween, each of at least a first segment and a second segment of the plurality of connected segments having at least a second wall fixedly attached to the first wall;

a substrate having a plurality of lamps affixed thereto, the substrate configured to be disposed within a channel formed by at least the first wall and the second wall; and a lens configured to be disposed above the substrate within the channel, such that light from the plurality of lamps radiates through the lens;

at least one flexible hinge rotatably coupling the first segment to the second segment to define a select angle of a plurality of configurable angles between the first segment and the second segment;

wherein the first segment, second segment and the at least one flexible hinge are integrally formed together; and wherein the at least one flexible hinge includes spaced apart first and second metal connectors between the back wall of the first segment and the back wall of the second segment.

11. A light fixture assembly, comprising:

a bracket having a plurality of connected segments, each segment having a first wall operably connected to a first wall of an adjacent segment such as to allow relative rotatable movement therebetween, each of at least a first segment and a second segment of the plurality of connected segments having at least a second wall fixedly attached to the first wall;

a substrate having a plurality of lamps affixed thereto, the substrate configured to be disposed within a channel formed by at least the first wall and the second wall; and a lens configured to be disposed above the substrate within the channel, such that light from the plurality of lamps radiates through the lens;

wherein each of the connected segments includes a third wall extending between the first wall and the second wall, wherein the second wall of each segment is spaced apart from the second wall of an adjacent segment, and wherein the third wall forms a part of the channel; and wherein the substrate and lens are formed as a first lamp module configured to be disposed within the channel, and further comprising at least a further lamp module configured to be disposed within the channel with the first lamp module, the further lamp module having a further substrate having a further plurality of lamps affixed thereto, and a further lens disposed above the further substrate, such that light from the further plurality of lamps radiates through the further lens.

12. The light fixture of claim 11, wherein the second wall of the first segment further includes a throughhole for receiving a fastener.

13. The light fixture of claim 11, further comprising at least one flexible hinge rotatably coupling the first segment to the second segment to define a select angle of a plurality of configurable angles between the first segment and the second segment; and wherein the flexible hinge is configured to retain the select angle absent applied external force.

14. The light fixture of claim 11, wherein the first lamp module includes a front wall and a rear wall, and wherein the substrate is disposed between at least indirectly coupled to the front wall and the rear wall.

15. The light fixture of claim 14, wherein the lens extends at least in part between the front wall and the rear wall above the substrate.

16. The light fixture of claim 14, wherein the first lamp module and the second lamp module are configured to be disposed within the channel such that they extend end-to-end.

17. The light fixture of claim 16, wherein the first lamp module and the second lamp module are configured to be disposed within the channel such that they extend end-to-end in a skewed manner.

* * * * *